US012654862B2

(12) United States Patent
Reese et al.

(10) Patent No.: US 12,654,862 B2
(45) Date of Patent: Jun. 16, 2026

(54) ELECTRONICALLY ACTUATED SEAT RECLINE RELEASE

(71) Applicant: Textron Innovations Inc., Providence, RI (US)

(72) Inventors: Matthew William Reese, Wichita, KS (US); David Wayne Davis, Wichita, KS (US); Joshua Lawrence Bell, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 324 days.

(21) Appl. No.: 18/362,538

(22) Filed: Jul. 31, 2023

(65) Prior Publication Data

US 2025/0042552 A1 Feb. 6, 2025

(51) Int. Cl.
B60N 2/23 (2006.01)
B64D 11/06 (2006.01)

(52) U.S. Cl.
CPC .............. B64D 11/064 (2014.12); B60N 2/23 (2013.01)

(58) Field of Classification Search
CPC ................................ B64D 11/064; B60N 2/23
See application file for complete search history.

(56) References Cited

U.S. PATENT DOCUMENTS

| | | | | | |
|---|---|---|---|---|---|
| 2,599,079 | A | * | 6/1952 | Tatom | B60N 2/2209 |
| | | | | | 297/320 |
| 4,515,034 | A | * | 5/1985 | Porter | B60N 2/231 |
| | | | | | 188/300 |
| 5,002,172 | A | * | 3/1991 | Stringer | B64D 11/06 |
| | | | | | 192/142 R |
| 5,984,412 | A | * | 11/1999 | Magyar | B60N 2/23 |
| | | | | | 297/367 R |
| 6,279,416 | B1 | * | 8/2001 | Bucholtz | F16C 1/12 |
| | | | | | 74/502 |
| 6,386,345 | B1 | * | 5/2002 | Hamilton | B60N 2/4214 |
| | | | | | 297/216.13 |
| 6,902,238 | B1 | * | 6/2005 | Abt | B60N 2/24 |
| | | | | | 297/423.26 |
| 7,182,402 | B1 | * | 2/2007 | Ahad | B64D 11/064 |
| | | | | | 297/354.12 |

(Continued)

FOREIGN PATENT DOCUMENTS

| | | | | | |
|---|---|---|---|---|---|
| DE | 102015006949 | A1 | * | 12/2016 | F16F 9/0263 |
| WO | WO-0156830 | A1 | * | 8/2001 | B60N 2/231 |

*Primary Examiner* — Timothy J Brindley
(74) *Attorney, Agent, or Firm* — Slater Matsil, LLP

(57) ABSTRACT

A seat release system and device, the system including an interface assembly that provides actuation signaling, an actuation device that communicatively provides mechanical motion in response to the actuation signaling, a cable connected to the actuation device, and a recline release cylinder having a gas release button and a release lever at a first end, and having a cylinder piston arm in the recline release cylinder at a second end. The release lever is attached to a second end of the cable where the cable moves the release lever in response to the mechanical motion of the actuation device. The gas release button vents the recline release cylinder to atmosphere in response to being depressed as a result of the cable moving the release lever. The cylinder piston arm may move in the recline release cylinder in response to the gas release button being depressed.

17 Claims, 3 Drawing Sheets

(56)  References Cited

U.S. PATENT DOCUMENTS

| | | | |
|---|---|---|---|
| 7,501,597 B2 * | 3/2009 | Voltz | A47C 31/008 |
| | | | 200/5 R |
| 8,376,462 B2 * | 2/2013 | Marini | B64D 11/06 |
| | | | 297/411.27 |
| 8,757,714 B2 * | 6/2014 | Ward | B60N 2/231 |
| | | | 297/216.13 |
| 10,173,778 B2 * | 1/2019 | Senneff | H02B 1/048 |
| 10,259,584 B2 * | 4/2019 | Oleson | B60N 2/1821 |
| 10,323,680 B2 * | 6/2019 | Carabalona | F16C 1/101 |
| 10,575,643 B2 * | 3/2020 | Wandschneider | B60N 2/0224 |
| 10,604,048 B2 * | 3/2020 | Vela | B60N 2/231 |
| 10,696,191 B2 * | 6/2020 | Does | F16H 21/44 |
| 2024/0255017 A1 * | 8/2024 | Raybern | B60N 2/929 |

* cited by examiner

ELECTRONICALLY ACTUATED SEAT RECLINE RELEASE

TECHNICAL FIELD

The present invention relates generally to a system and method for a recline release for a seat, and, in particular embodiments, to a system and method for an electronically actuated recline release for an aircraft seat.

BACKGROUND

Generally, a control mechanism for a recline release in, for example, a seat in an aircraft is based on mechanical cabling. A push button or a lever is mounted on, for example, a seat arm. When the push button or lever is operated by a user in the seat, attached cabling transfers the force applied to the push button or lever to a recline release cylinder. However, because the operation of the recline release cylinder is based on mechanic force applied to the push button or lever, significant physical effort is required on the user's part. Additionally, as there is attached cabling that needs to run from the push button or control lever to the recline release cylinder, limits are placed on the location and style of the push button or lever.

SUMMARY

According to a first embodiment a seat recline release system is provided. The seat recline release system includes an interface assembly, configured to provide actuation signaling, an actuation device communicatively connected to the interface assembly and configured to receive the actuation signaling, where the actuation device is configured to provide mechanical motion in response to the actuation signaling, a cable having a first end connected to the actuation device, and a recline release cylinder having a gas release button and a release lever at a first end, and further having a cylinder piston arm in the recline release cylinder at a second end, where the release lever is attached to an extension of the recline release cylinder at a pivot point on a first end of the release lever, where the release lever has a cable attachment point at a second end of the release lever, where a second end of the cable is attached to the second end of release lever, where the cable is configured to move the release lever in response to the mechanical motion of the actuation device, where the release lever covers the gas release button, where the gas release button is operable to vent the recline release cylinder to atmosphere in response to being depressed as a result of the cable moving the release lever, and where the release lever is attached to the actuation device through a first mechanical cable, and where a first end of the cylinder piston arm is disposed in the recline release cylinder, where a second end of the cylinder piston arm has an attachment point configured to be attached to a seat back support structure, where the cylinder piston arm is operable to move into, and out of, the recline release cylinder in response to the gas release button being depressed, and where the cylinder piston arm is operable to be held in substantially the same position within the recline release cylinder while the gas release button is released.

In a possible implementation, the seat recline release system may also include a controller, where the controller receives actuation signaling information from the interface assembly, where the controller is electrically connected to the actuation device through first electrical cabling, and where the controller is configured to provide an actuation signal to the actuation device according to the actuation signaling information from the interface assembly.

In a possible implementation, the interface assembly is a push button assembly including an electrical switch, where the controller is configured to receive a sense voltage applied to the push button assembly by the controller, where the sense voltage is applied to the push button assembly through second electrical cabling from the controller to the push button assembly, and is selectively passed back to the controller from the push button assembly based on a state of the push button assembly.

In a possible implementation, based on the push button assembly being in a depressed state, the electrical switch is closed and the sense voltage is passed through the electrical switch back to an input of the controller, and where, based on the push button assembly being in an unpressed state, the electrical switch is open and the sense voltage is not passed through the electrical switch back to the input of the controller.

In a possible implementation, based on the push button assembly being in a depressed state, the electrical switch is open and the sense voltage is not passed through the electrical switch back to an input of the controller, and where, based on the push button assembly being in an unpressed state, the electrical switch is closed and the sense voltage is passed through the input of the controller.

In a possible implementation, the seat recline release system includes two recline release cylinders, two cylinder piston arms, and two actuation devices, where the controller sends the actuation signaling to each of the actuation devices based on a receiving the signaling information from the push button assembly, where that the controller is electrically connected to each of the two actuation devices includes two electrical cables, where a first actuation device of the two actuation devices is attached to a first release lever of a first recline release cylinder of the two recline release cylinders by the first mechanical cable, and where a second actuation device of the two actuation devices is attached to a second release lever of a second recline release cylinder of the two recline release cylinders by a second mechanical cable.

In a possible implementation, the seat recline release system includes two recline release cylinders, two cylinder piston arms, and one actuation device, where the controller sends the actuation signaling to the actuation device based on a receiving the signaling information from the push button assembly, where the actuation device is attached to a first release lever of a first recline release cylinder of the two recline release cylinders by the first mechanical cable, and where the actuation device is attached to a second release lever of a second recline release cylinder of the two recline release cylinders by a second mechanical cable.

In a possible implementation, the controller is communicatively connected to the push button assembly using a wireless communication protocol. In a possible implementation, the actuation device is a servo.

According to a second embodiment a seat structure is provided. The seat structure includes a seatback assembly having a pivot bar and a lower support frame hingedly connected to the pivot bar, and where the lower support frame has a connection point located at a point lower in the seat structure on the lower support frame than the pivot bar, an interface assembly, disposed in the seat structure in a region adjacent to an occupant seating area, an actuation device, where the actuation device is communicatively connected to the interface assembly, and where the actuation device is configured to provide mechanical motion in response to actuation signaling from the interface assembly, a first mechanical cable having a first end connected to the actuation device, and a recline release cylinder having a gas release button and a release lever at a first end, and further having a cylinder piston arm disposed in the recline release cylinder at a second end of the recline release cylinder opposite the first end, where a pivot point on a first end of the release lever is attached to an extension of the recline release cylinder, where the release lever has a cable attachment point at a second end of the release lever, where a second end of the first mechanical cable is attached to the second end of release lever, and where the first mechanical cable is configured to move the release lever in response to the mechanical motion of the actuation device, where the release lever covers the gas release button, where the gas release button is operable to vent an internal void of the recline release cylinder to atmosphere when depressed, and where the release lever is attached to the actuation device through the first mechanical cable, and where a first end of the cylinder piston arm is disposed in the recline release cylinder, where a second end of the cylinder piston arm is connected to the connection point on the lower support frame, where the cylinder piston arm is operable to move into, or out of, the recline release cylinder in response to the gas release button being depressed, and where the cylinder piston arm is operable to be held in substantially the same position within the recline release cylinder while the gas release button is released.

In a possible implementation, the seat structure may include a controller, where the controller receives actuation signaling from the interface assembly, where the controller is electrically connected to the actuation device through first electrical cabling, and where the controller is configured to provide an actuation signal to the actuation device according to the actuation signaling from the interface assembly.

In a possible implementation, the interface assembly is a push button assembly including an electrical switch, where the actuation signaling from the interface assembly includes receiving a sense voltage applied to the push button assembly by the controller, where the sense voltage is applied to the push button assembly through second electrical cabling from the controller to the push button assembly, and is selectively passed back to the controller from the push button assembly based on an activation state of the push button assembly.

In a possible implementation, the interface assembly being in an activated state includes the electrical switch being closed and the sense voltage being passed through the electrical switch back to an input of the controller, and where, based on the push button assembly being in an inactivated state includes the electrical switch being open and the sense voltage being blocked from passing through the electrical switch back to the input of the controller.

In a possible implementation, based on the push button assembly being in a depressed state, the electrical switch is open and the sense voltage is not passed through the electrical switch back to an input of the controller, and where, based on the push button assembly being in an unpressed state, the electrical switch is closed and the sense voltage is passed through the electrical switch back to the input of the controller.

In a possible implementation, the seat structure includes two recline release cylinders, two cylinder piston arms, and two actuation devices, where the controller sends the actuation signaling to each of the actuation devices based on signaling information from the interface assembly, where the first electrical cabling from the controller to each of the two actuation devices includes two electrical cables, where a first actuation device of the two actuation devices is attached to a first release lever of a first recline release cylinder of the two recline release cylinders by the first mechanical cable, and where a second actuation device of the two actuation devices is attached to a second release lever of a second recline release cylinder of the two recline release cylinders by a second mechanical cable.

In a possible implementation, the seat structure includes two recline release cylinders, two cylinder piston arms, and one actuation device, where the controller sends the actuation signaling to the actuation device based on signaling information from the interface assembly, where the actuation device is attached to a first release lever of a first recline release cylinder of the two recline release cylinders by the first mechanical cable, and where the actuation device is attached to a second release lever of a second recline release cylinder of the two recline release cylinders by a second mechanical cable.

In a possible implementation, the controller is communicatively connected to the interface assembly using a wireless communication protocol. In a possible implementation, the controller is communicatively connected to the interface assembly through a hard-wired electrical connection.

According to a third embodiment a seat recline release is provided. The seat recline release includes an interface assembly, an actuation device communicatively connected to the interface assembly, where the actuation device is configured to receive electrical or electronic actuation communication information initiated by the interface assembly, and to provide mechanical motion according to the actuation communication information, a recline release cylinder, and a cylinder piston arm, connected to a lower support frame of a seatback in a seat, where the cylinder piston arm is operable to move within a recline release cylinder according to the mechanical motion, and where a reclined position of the seatback is associated with a position of the cylinder piston arm within the recline release cylinder, where a gas release button on the recline release cylinder is configured to be depressed or released based on the mechanical motion, where the actuation device being configured to provide the mechanical motion according to the actuation communication information includes the actuation device being configured to move a mechanical cable to a first position that depresses the gas release button in response to an activation state of the interface assembly being in a depressed state, where the actuation device being configured to provide the mechanical motion according to the actuation communication information further includes the actuation device being configured to move a mechanical cable to a second position that releases the gas release button in response to an activation state of the interface assembly being in a released state, and where the cylinder piston arm is free to move within the recline release cylinder based on the gas release button being depressed, and where the cylinder piston arm is held in substantially the same position within the recline release cylinder based on the gas release button being released.

In a possible implementation, the seat recline release also includes a controller, where the controller is operable to receive electronic actuation communication information initiated by the interface assembly, and send, based on the received electronic actuation communication information, an actuation signal to the actuation device using a hard-wired connection between the controller and the actuation device, the actuation signal causing the actuation device to provide mechanical motion according to the actuation signal.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

Embodiments of the principles presented herein are directed toward an improved seat recline release system, on a seat used in, for example, an aircraft. As can be seen through the disclosures below, the system provides high-quality parts that can be customized and result in greater freedom of design in the style, location, and function of a seat recline release system.

Certain embodiments of the disclosure are discussed within the context of aircraft seating. However, it will be understood that the disclosure is not limited to only aircraft seating, and may find uses in watercraft, automobile, or other passenger vehicle seating as well. It will also be understood that the embodiments disclosed herein may be used with any aircraft, including fixed wing, rotorcraft, commercial, military, or civilian aircraft. Embodiments of the present disclosure are not limited to any particular setting or application, and embodiments can be used in any setting or application such as with other aircraft, vehicles, or equipment.

Figure 1:
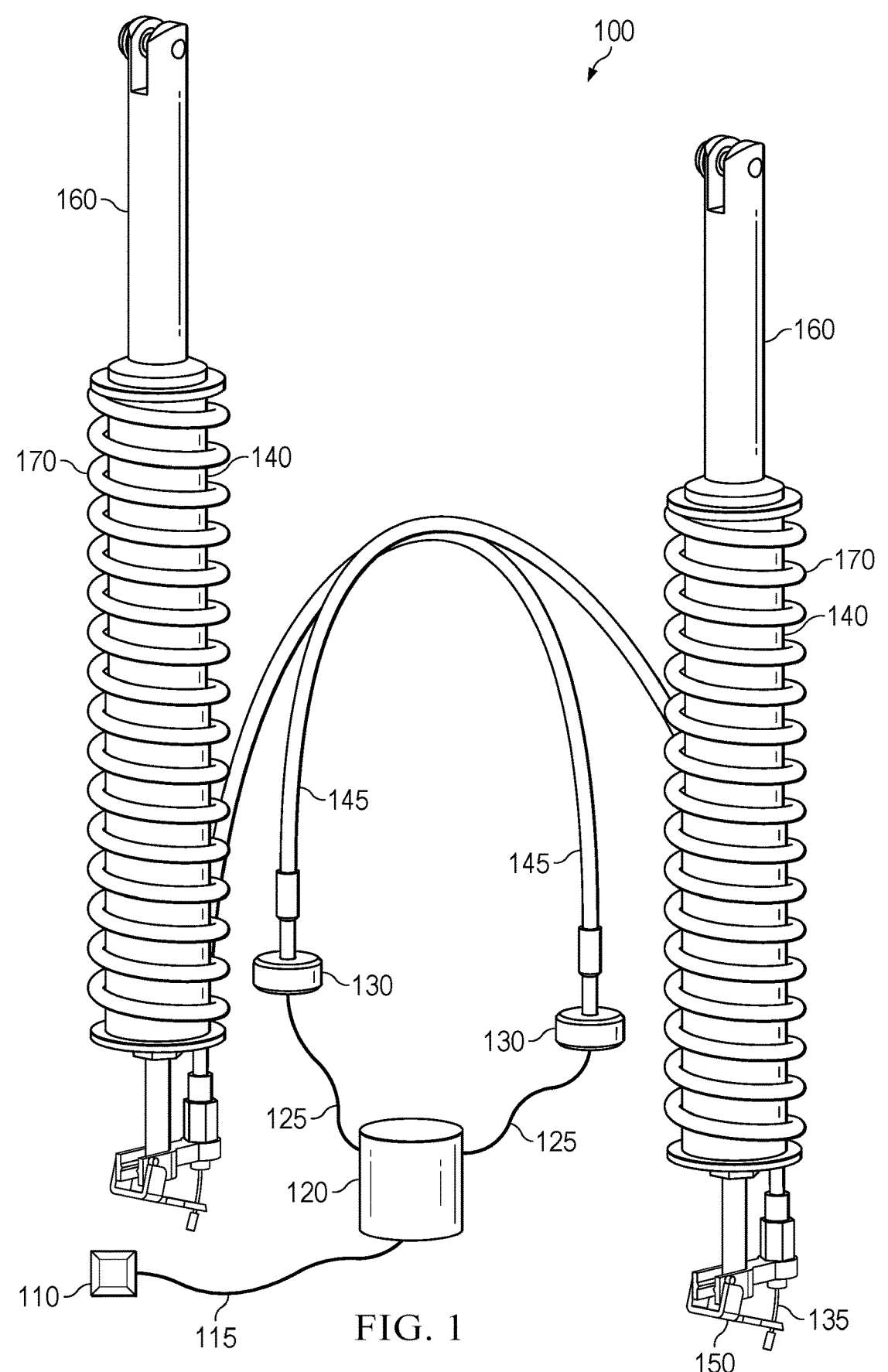
FIG. 1 is a diagram showing a seat recline release system according to some embodiments.

FIG. 1 is a diagram showing a seat recline release system 100 according to some embodiments. An interface assembly, such as push button assembly 110, is provided within easy reach of a seated occupant. In some embodiments, an electrical switch within the push button assembly 110 sends an electrical signal to one or more actuation devices 130 connected to one or more recline release cylinders 140. In other embodiments, the interface assembly maybe a touch-screen, voice activated system, level, or other electric, software, mechanical, or hardware interface through which a user may indicate that they wish to move the seatback.

In some embodiments, the electrical signal is transmitted from the push button 110, through electrical cabling 115, to a controller 120. The controller 120 may be in communication with the push button assembly 110 via a communication protocol. In some embodiments the controller 120 may be hardwired to the switch in the push button assembly 110 such that a signal is transmitted from the controller 120, to the push button assembly 110, and passed back to the controller 120 or stopped based on the position of the push button assembly 110. For example, in some embodiments, a sense voltage may be applied through cabling 115 by the controller 120 to a first side of a switch in the push button assembly 110. When the push button assembly 110 is in an unpressed state, the switch in the push button assembly 110 may be in a normally-open state such that the sense voltage received from the controller 120 by the push button assembly 110 is not transmitted back to the controller 120. When the push button assembly 110 is in a depressed state, meaning that the seat occupant is attempting to actuate the seat recline release, the switch in the push button assembly 110 may be closed such that the sense voltage received from the controller 120 by the push button assembly 110 is then transmitted back to the controller 120, signaling to the controller 120 that the push button assembly 110 has been depressed.

Alternatively, in other embodiments, the switch in the push button assembly 110 may be a normally-closed switch such that a sense voltage applied to the push button assembly 110 by the controller 120 through cabling 115 is transmitted back to the controller 120 when the push button assembly 110 is in an unpressed state, and interrupted when the push button assembly 110 is in a depressed state.

In some embodiments, the signaling between the push button assembly 110 and the controller may be based on a wired or wireless (such as Bluetooth, Wi-Fi, Zigbee, or the like) signaling protocol.

The controller 120, or push button assembly 110 directly, may send an actuation signal to one or more actuation devices 130 when the seat occupant depresses the push button assembly 110 indicating a desire to activate the seat recline release system 100. In some embodiments, this signaling may be a voltage applied to cabling 125 from the controller to the one or more actuation devices 130. In some embodiments, the signaling between the controller 120 and the one or more actuation devices 130 may be based on a wired or wireless (such as Bluetooth, Wi-Fi, Zigbee, or the like) signaling protocol.

The one or more actuation devices 130 translate the electrical signal from the controller 120, or the push button assembly 110, to mechanical energy. These actuation devices 130 may be servos, stepper motors, motors, linear actuators, solenoids or the like. As shown in the embodiment of FIG. 1, where the actuation devices 130 are servos, when an actuation signal is received from the controller 120, the actuation devices 130, retracts the cables 135 by applying a pulling force to cables 135 (retained in cable sleeves 145).

The pull force applied to the cable 135 is then translated to a release lever 150. The force translated to the release lever 150 causes the release lever to pivot and interact with a release button (see 210 in FIG. 2). The release button allows the recline release cylinder 140 to vent gas and allows the cylinder piston arm 160 to move, and therefore allows the seatback of an associated seat (see FIG. 3) to move.

Springs 170 provide a back-force on the recline release cylinder 140 to return the seat to a normal upright position when the recline release system is actuated with no reclining force being applied to the seatback, such as when the seat is unoccupied.

When the actuation signal is removed from the one or more actuation device 130 by the controller 120, or push button assembly 110, such as by the seat occupant releasing the push button assembly 110, the actuation devices 130 return to an original position. The return of the actuation devices to their original position releases the tension on cable 135, and allows, or directly causes, the release lever 150 to disengage from the release button 210. A gas lock is then created in recline release cylinder 140, generally preventing movement of the cylinder piston arm 160, and the associated seatback. In some embodiments the cabling 135 and cable sleeves 145 may be replaced by other mechanical means of actuation, such as linkages, and the like.

In some embodiments, one or more of the above described parts may be removed or further duplicated. For example, in some embodiments, a single actuation device 130 may be used in conjunction with two recline release cylinders 140 such that two mechanical cables or linkages are attached to the single actuation device 130 on one end, and each cable or linkage is attached to the individual recline release cylinder 140 release levers 150 on an opposite end. Alternatively, a single actuation device 130, cable or linkage, and gas release cylinder 140 is also envisioned in some embodiments.

Figure 2:
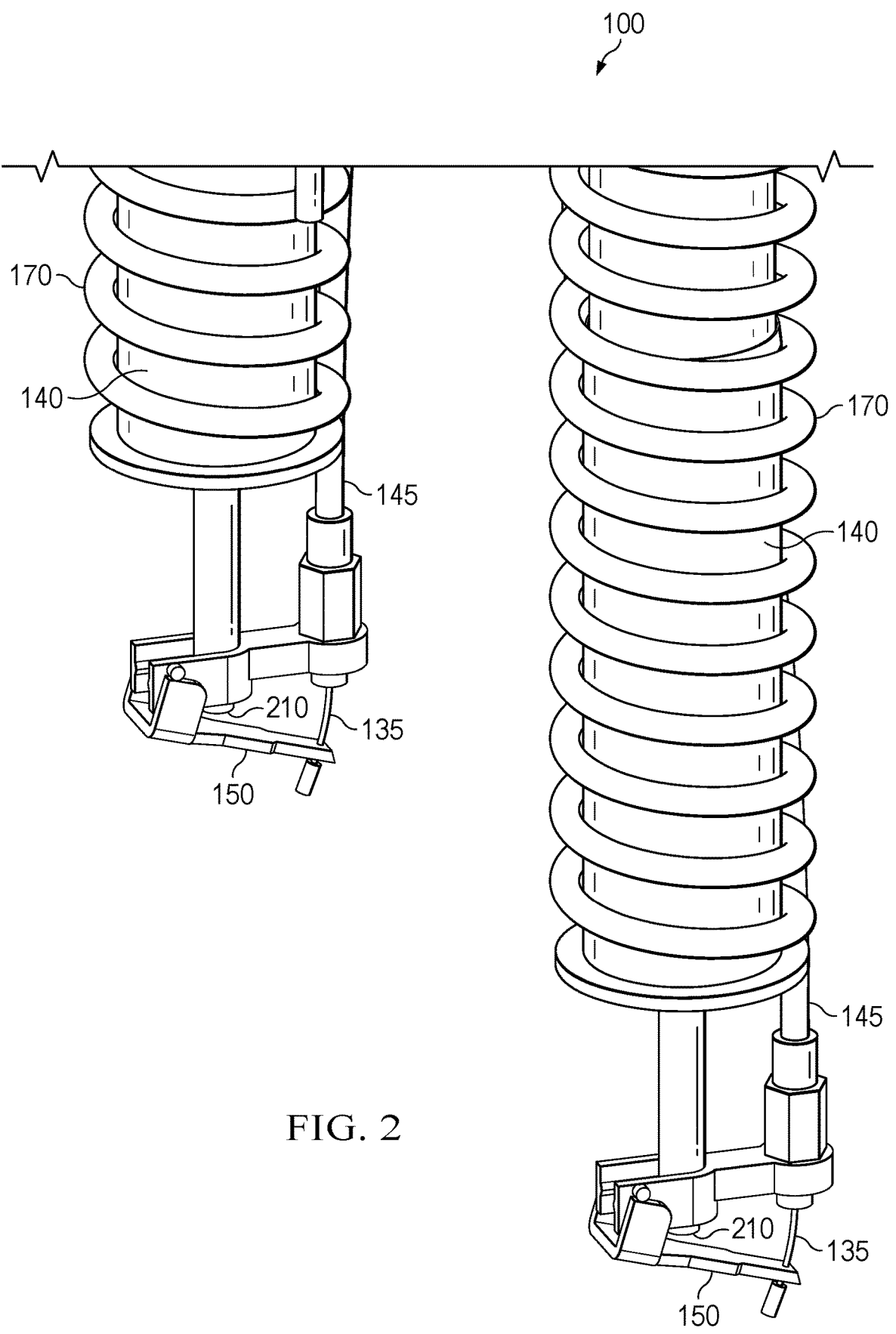
FIG. 2 is a diagram showing a partial perspective view of a seat recline release system according to some embodiments.

FIG. 2 is a diagram showing a partial perspective view of the seat recline release system 100 according to some embodiments. In the view shown in FIG. 2, the release button 210 may be more clearly shown. When cable 135 is pulled, release lever 150 pivots counterclockwise (in this view) such that the release lever 150 impinges on the release button 210. This allows gas to vent from the recline release cylinder 140. When tension on cable 135 is released, the release lever 150 pivots clockwise and disengages from release button 210, thus sealing the recline release cylinder 140, and creating a gas lock in the recline release cylinder 140.

Figure 3:
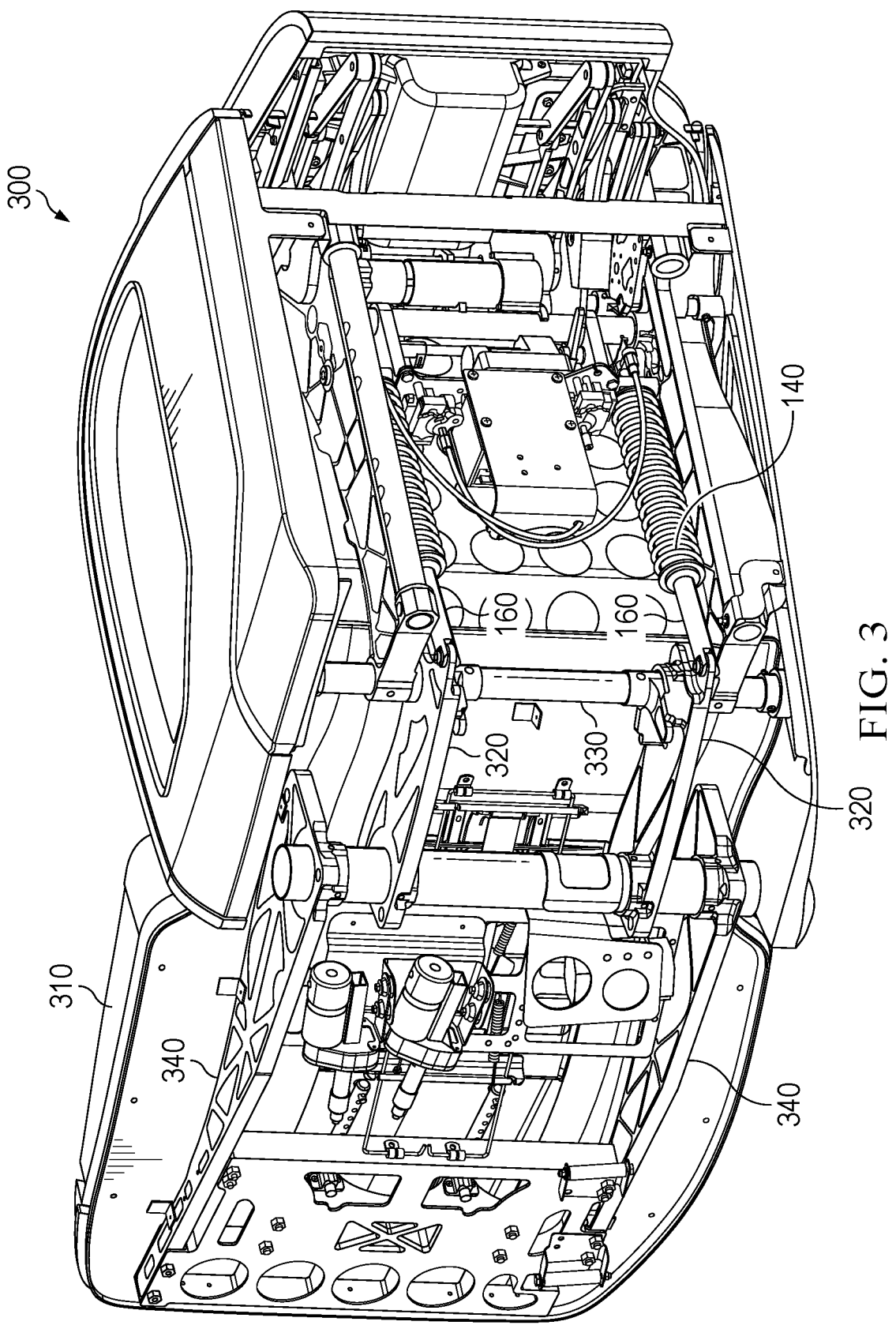
FIG. 3 is a diagram of a seat recline release in an exemplary aircraft seat according to some embodiments.

FIG. 3 is a diagram of a seat recline release in an exemplary aircraft seat 300 according to some embodiments. One or more lower support frames 320, in conjunction with the one or more upper support frames 340, maintain the shape of the aircraft seatback 310 and provide structural support to the aircraft seat 300. The one or more lower support frames 320 of aircraft seatback 310 are connected at a bottom point to the recline release cylinders 140 via the cylinder piston arms 160. Additionally, the aircraft seatback 310 pivots around pivot bar 330, allowing the seatback 310 to recline or move towards an upright position. The pivot bar 330 is located higher in the one or more lower support frames 320 of the aircraft seatback 310 than the connection points to the cylinder piston arm 160. Accordingly, when seatback 310 is adjusted towards a reclined position, the seatback 310 will pivot around pivot bar 330 causing the lower portions of the one or more lower support frames 320 to move toward recline release cylinder 140. Alternatively, when seatback 310 is adjusted towards an upright position, the seatback 310 will pivot clockwise around pivot bar 330 causing the lower portions of the one or more lower support frames 320 to move away from recline release cylinder 140.

However, when the gas lock is active on the recline release cylinder 140, cylinder piston arm 160 is unable to move substantially within the recline release cylinder 140. Accordingly, the lower portions of the one or more lower support frames 320 impinge upon the cylinder piston arm 160, and the seatback 310 is maintained in its current position.

As the gas lock is released on recline release cylinder 140, cylinder piston arm 160 is free to move in and out of the recline release cylinders 140. This allows the lower portions of the one or more lower support frames 320 to move, and the seatback 310 to pivot around pivot bar 330, until the gas lock is reapplied to the recline release cylinder 140.

According to a first embodiment a seat recline release system is provided. The seat recline release system includes an interface assembly, configured to provide actuation signaling, an actuation device communicatively connected to the interface assembly and configured to receive the actuation signaling, where the actuation device is configured to provide mechanical motion in response to the actuation signaling, a cable having a first end connected to the actuation device, and a recline release cylinder having a gas release button and a release lever at a first end, and further having a cylinder piston arm in the recline release cylinder at a second end, where the release lever is attached to an extension of the recline release cylinder at a pivot point on a first end of the release lever, where the release lever has a cable attachment point at a second end of the release lever, where a second end of the cable is attached to the second end of release lever, where the cable is configured to move the release lever in response to the mechanical motion of the actuation device, where the release lever covers the gas release button, where the gas release button is operable to vent the recline release cylinder to atmosphere in response to being depressed as a result of the cable moving the release lever, and where the release lever is attached to the actuation device through a first mechanical cable, and where a first end of the cylinder piston arm is disposed in the recline release cylinder, where a second end of the cylinder piston arm has an attachment point configured to be attached to a seat back support structure, where the cylinder piston arm is operable to move into, and out of, the recline release cylinder in response to the gas release button being depressed, and where the cylinder piston arm is operable to be held in substantially the same position within the recline release cylinder while the gas release button is released.

In a possible implementation, the seat recline release system may also include a controller, where the controller receives actuation signaling information from the interface assembly, where the controller is electrically connected to the actuation device through first electrical cabling, and where the controller is configured to provide an actuation signal to the actuation device according to the actuation signaling information from the interface assembly.

In a possible implementation, the interface assembly is a push button assembly including an electrical switch, where the controller is configured to receive a sense voltage applied to the push button assembly by the controller, where the sense voltage is applied to the push button assembly through second electrical cabling from the controller to the push button assembly, and is selectively passed back to the controller from the push button assembly based on a state of the push button assembly.

In a possible implementation, based on the push button assembly being in a depressed state, the electrical switch is closed and the sense voltage is passed through the electrical switch back to an input of the controller, and where, based on the push button assembly being in an unpressed state, the electrical switch is open and the sense voltage is not passed through the electrical switch back to the input of the controller.

In a possible implementation, based on the push button assembly being in a depressed state, the electrical switch is open and the sense voltage is not passed through the electrical switch back to an input of the controller, and where, based on the push button assembly being in an unpressed state, the electrical switch is closed and the sense voltage is passed through the electrical switch back to the input of the controller.

In a possible implementation, the seat recline release system includes two recline release cylinders, two cylinder piston arms, and two actuation devices, where the controller sends the actuation signaling to each of the actuation devices based on a receiving the signaling information from the push button assembly, where that the controller is electrically connected to each of the two actuation devices includes two electrical cables, where a first actuation device of the two actuation devices is attached to a first release lever of a first recline release cylinder of the two recline release cylinders by the first mechanical cable, and where a second actuation device of the two actuation devices is attached to a second release lever of a second recline release cylinder of the two recline release cylinders by a second mechanical cable.

In a possible implementation, the seat recline release system includes two recline release cylinders, two cylinder piston arms, and one actuation device, where the controller sends the actuation signaling to the actuation device based on a receiving the signaling information from the push button assembly, where the actuation device is attached to a first release lever of a first recline release cylinder of the two recline release cylinders by the first mechanical cable, and where the actuation device is attached to a second release lever of a second recline release cylinder of the two recline release cylinders by a second mechanical cable.

In a possible implementation, the controller is communicatively connected to the push button assembly using a wireless communication protocol. In a possible implementation, the actuation device is a servo.

According to a second embodiment a seat structure is provided. The seat structure includes a seatback assembly having a pivot bar and a lower support frame hingedly connected to the pivot bar, and where the lower support frame has a connection point located at a point lower in the seat structure on the lower support frame than the pivot bar, an interface assembly, disposed in the seat structure in a region adjacent to an occupant seating area, an actuation device, where the actuation device is communicatively connected to the interface assembly, and where the actuation device is configured to provide mechanical motion in response to actuation signaling from the interface assembly, a first mechanical cable having a first end connected to the actuation device, and a recline release cylinder having a gas release button and a release lever at a first end, and further having a cylinder piston arm disposed in the recline release cylinder at a second end of the recline release cylinder opposite the first end, where a pivot point on a first end of the release lever is attached to an extension of the recline release cylinder, where the release lever has a cable attachment point at a second end of the release lever, where a second end of the first mechanical cable is attached to the second end of release lever, and where the first mechanical cable is configured to move the release lever in response to the mechanical motion of the actuation device, where the release lever covers the gas release button, where the gas release button is operable to vent an internal void of the recline release cylinder to atmosphere when depressed, and where the release lever is attached to the actuation device through the first mechanical cable, and where a first end of the cylinder piston arm is disposed in the recline release cylinder, where a second end of the cylinder piston arm is connected to the connection point on the lower support frame, where the cylinder piston arm is operable to move into, or out of, the recline release cylinder in response to the gas release button being depressed, and where the cylinder piston arm is operable to be held in substantially the same position within the recline release cylinder while the gas release button is released.

In a possible implementation, the seat structure may include a controller, where the controller receives actuation signaling from the interface assembly, where the controller is electrically connected to the actuation device through first electrical cabling, and where the controller is configured to provide an actuation signal to the actuation device according to the actuation signaling from the interface assembly.

In a possible implementation, the interface assembly is a push button assembly including an electrical switch, where the actuation signaling from the interface assembly includes receiving a sense voltage applied to the push button assembly by the controller, where the sense voltage is applied to the push button assembly through second electrical cabling from the controller to the push button assembly, and is selectively passed back to the controller from the push button assembly based on an activation state of the push button assembly.

In a possible implementation, the interface assembly being in an activated state includes the electrical switch being closed and the sense voltage being passed through the electrical switch back to an input of the controller, and where, based on the push button assembly being in an inactivated state includes the electrical switch being open and the sense voltage being blocked from passing through the electrical switch back to the input of the controller.

In a possible implementation, based on the push button assembly being in a depressed state, the electrical switch is open and the sense voltage is not passed through the electrical switch back to an input of the controller, and where, based on the push button assembly being in an unpressed state, the electrical switch is closed and the sense voltage is passed through the electrical switch back to the input of the controller.

In a possible implementation, the seat structure includes two recline release cylinders, two cylinder piston arms, and two actuation devices, where the controller sends the actuation signaling to each of the actuation devices based on signaling information from the interface assembly, where the first electrical cabling from the controller to each of the two actuation devices includes two electrical cables, where a first actuation device of the two actuation devices is attached to a first release lever of a first recline release cylinder of the two recline release cylinders by the first mechanical cable, and where a second actuation device of the two actuation devices is attached to a second release lever of a second recline release cylinder of the two recline release cylinders by a second mechanical cable.

In a possible implementation, the seat structure includes two recline release cylinders, two cylinder piston arms, and one actuation device, where the controller sends the actuation signaling to the actuation device based on signaling information from the interface assembly, where the actuation device is attached to a first release lever of a first recline release cylinder of the two recline release cylinders by the first mechanical cable, and where the actuation device is attached to a second release lever of a second recline release cylinder of the two recline release cylinders by a second mechanical cable.

In a possible implementation, the controller is communicatively connected to the interface assembly using a wireless communication protocol. In a possible implementation, the controller is communicatively connected to the interface assembly through a hard-wired electrical connection.

According to a third embodiment a seat recline release is provided. The seat recline release includes an interface assembly, an actuation device communicatively connected to the interface assembly, where the actuation device is configured to receive electrical or electronic actuation communication information initiated by the interface assembly, and to provide mechanical motion according to the actuation communication information, a recline release cylinder, and a cylinder piston arm, connected to a lower support frame of a seatback in a seat, where the cylinder piston arm is operable to move within a recline release cylinder according to the mechanical motion, and where a reclined position of the seatback is associated with a position of the cylinder piston arm within the recline release cylinder, where a gas release button on the recline release cylinder is configured to be depressed or released based on the mechanical motion, where the actuation device being configured to provide the mechanical motion according to the actuation communication information includes the actuation device being configured to move a mechanical cable to a first position that depresses the gas release button in response to an activation state of the interface assembly being in a depressed state, where the actuation device being configured to provide the mechanical motion according to the actuation communication information further includes the actuation device being configured to move a mechanical cable to a second position that releases the gas release button in response to an activation state of the interface assembly being in a released state, and where the cylinder piston arm is free to move within the recline release cylinder based on the gas release button being depressed, and where the cylinder piston arm is held in substantially the same position within the recline release cylinder based on the gas release button being released.

In a possible implementation, the seat recline release also includes a controller, where the controller is operable to receive electronic actuation communication information initiated by the interface assembly, and send, based on the received electronic actuation communication information, an actuation signal to the actuation device using a hard-wired connection between the controller and the actuation device, the actuation signal causing the actuation device to provide mechanical motion according to the actuation signal.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A seat recline release system, comprising:

an interface assembly, configured to provide actuation signaling;

at least one actuation device communicatively connected to the interface assembly and configured to receive the actuation signaling, wherein the actuation device is configured to provide mechanical motion in response to the actuation signaling;

a first mechanical cable and a second mechanical cable, each having a first end connected to the at least one actuation device;

two recline release cylinders, each having a gas release button and a release lever at a first end of a respective recline release cylinder, and each further having a cylinder piston arm in the respective recline release cylinder at a second end of the respective recline release cylinder, wherein the at least one actuation device is attached to a first release lever of a first recline release cylinder of the two recline release cylinders by the first mechanical cable, and wherein the at least one actuation device is attached to a second release lever of a second recline release cylinder of the two recline release cylinders by the second mechanical cable; and a controller, configured to receive actuation signaling information from the interface assembly, wherein the controller is electrically connected to the at least one actuation device through first electrical cabling, and wherein the controller sends the actuation signaling to the at least one actuation device based on receiving the signaling information from the interface assembly;

wherein the release lever of each recline release cylinder of the two recline release cylinders is attached to an extension of the respective recline release cylinder of the respective recline release cylinder at a pivot point on a first end of the respective release lever, wherein the respective release lever has a cable attachment point at a second end of the respective release lever, wherein a second end of one of the first mechanical cable or the second mechanical cable is attached to the second end of the release lever, wherein the one of the second mechanical cable or the second mechanical cable is configured to move the respective release lever in response to the mechanical motion of the at least one actuation device;

wherein the release lever of each recline release cylinder of the two recline release cylinders covers the gas release button of the respective recline release cylinder, wherein the gas release button of each recline release cylinder of the two recline release cylinders is operable to vent the respective recline release cylinder to atmosphere in response to being depressed as a result of one of the first mechanical cable or the second mechanical cable moving the respective release lever, and wherein the respective release lever is attached to the at least one actuation device through the one of the first mechanical cable or the second mechanical cable; and wherein a first end of the cylinder piston arm of each recline release cylinder of the two recline release cylinders is disposed in the respective recline release cylinder, wherein a second end of the cylinder piston arm of each recline release cylinder of the two recline release cylinders has an attachment point configured to be attached to a seat back support structure, wherein the cylinder piston arm of each recline release cylinder of the two recline release cylinders is operable to move into, and out of, the respective recline release cylinder in response to the respective gas release button being depressed, and wherein the cylinder piston arm of each recline release cylinder of the two recline release cylinders is operable to be held in substantially the same position within the respective recline release cylinder while the respective gas release button is released.

2. The seat recline release system of claim 1, wherein the controller is configured to provide an actuation signal to the actuation device according to the actuation signaling information from the interface assembly.

3. The seat recline release system of claim 2, wherein the interface assembly is a push button assembly comprising an electrical switch, wherein the controller is configured to receive a sense voltage applied to the push button assembly by the controller, wherein the sense voltage is applied to the push button assembly through second electrical cabling from the controller to the push button assembly, and is selectively passed back to the controller from the push button assembly based on a state of the push button assembly.

4. The seat recline release system of claim 3, wherein, based on the push button assembly being in a depressed state, the electrical switch is closed and the sense voltage is passed through the electrical switch back to an input of the controller; and wherein, based on the push button assembly being in an unpressed state, the electrical switch is open and the sense voltage is not passed through the electrical switch back to the input of the controller.

5. The seat recline release system of claim 3, wherein, based on the push button assembly being in a depressed state, the electrical switch is open and the sense voltage is not passed through the electrical switch back to an input of the controller; and wherein, based on the push button assembly being in an unpressed state, the electrical switch is closed and the sense voltage is passed through the electrical switch back to the input of the controller.

6. The seat recline release system of claim 3, wherein the at least one actuation device comprises two actuation devices, wherein the controller sends the actuation signaling to each actuation device of the two actuation devices based on receiving the actuation signaling information from the push button assembly, wherein the controller is electrically connected to each of the two actuation devices by a respective electrical cable.

7. The seat recline release system of claim 3, wherein the controller is communicatively connected to the push button assembly using a wireless communication protocol.

8. The seat recline release system of claim 1, wherein the actuation device is a servo.

9. A seat structure, comprising:

a seatback assembly having a pivot bar and a lower support frame hingedly connected to the pivot bar, and wherein the lower support frame has a connection point located at a point lower in the seat structure on the lower support frame than the pivot bar;

an interface assembly, disposed in the seat structure in a region adjacent to an occupant seating area;

at least one actuation device, wherein the actuation device is communicatively connected to the interface assembly, and wherein the actuation device is configured to provide mechanical motion in response to actuation signaling from the interface assembly;

a first mechanical cable and a second mechanical cable, each having a first end connected to the at least one actuation device;

two recline release cylinders, each having a gas release button and a release lever at a first end of a respective recline release cylinder, and each further having a cylinder piston arm disposed in the respective recline release cylinder at a second end of the respective recline release cylinder opposite the first end, wherein a pivot point on a first end of the release lever is attached to an extension of the recline release cylinder, wherein the at least one actuation device is attached to a first release lever of a first recline release cylinder of the two recline release cylinders by the first mechanical cable, and wherein the at least one actuation device is attached to a second release lever of a second recline release cylinder of the two recline release cylinders by the second mechanical cable; and a controller, configured to receive actuation signaling information from the interface assembly, wherein the controller is electrically connected to the at least one actuation device through first electrical cabling, and wherein the controller sends the actuation signaling to the at least one actuation device based on receiving the signaling information from the interface assembly;

wherein the release lever of each recline release cylinder of the two recline release cylinders has a cable attachment point at a second end of the respective release lever, wherein a second end one of the first mechanical cable or the second mechanical cable is attached to the second end of the release lever, and wherein the at least one of the first mechanical cable or the second mechanical cable is configured to move the release lever in response to the mechanical motion of the at least one actuation device;

wherein the release lever of each recline release cylinder of the two recline release cylinders covers the gas release button of the respective recline release cylinder, wherein the gas release button of each recline release cylinder of the two recline release cylinders is operable to vent an internal void of the respective recline release cylinder to atmosphere when depressed; and wherein the respective release lever is attached to the actuation device through the one of the first mechanical cable or the second mechanical cable; and wherein a first end of the cylinder piston arm of each recline release cylinder of the two recline release cylinders is disposed in the respective recline release cylinder, wherein a second end of the cylinder piston arm of each recline release cylinder of the two recline release cylinders is connected to the connection point on the lower support frame, wherein the cylinder piston arm of each recline release cylinder of the two recline release cylinders is operable to move into, or out of, the respective recline release cylinder in response to the respective gas release button being depressed, and wherein the cylinder piston arm of each recline release cylinder of the two recline release cylinders is operable to be held in substantially the same position within the respective recline release cylinder while the respective gas release button is released.

10. The seat structure of claim 9, wherein the controller is configured to provide an actuation signal to the actuation device according to the actuation signaling from the interface assembly.

11. The seat structure of claim 10, wherein the interface assembly is a push button assembly comprising an electrical switch, wherein the actuation signaling from the interface assembly comprises receiving a sense voltage applied to the push button assembly by the controller, wherein the sense voltage is applied to the push button assembly through second electrical cabling from the controller to the push button assembly, and is selectively passed back to the controller from the push button assembly based on an activation state of the push button assembly.

12. The seat structure of claim 11, wherein the interface assembly being in an activated state comprises the electrical switch being closed and the sense voltage being passed through the electrical switch back to an input of the controller; and wherein, based on the push button assembly being in an inactivated state comprises the electrical switch being open and the sense voltage being blocked from passing through the electrical switch back to the input of the controller.

13. The seat structure of claim 11, wherein, based on the push button assembly being in a depressed state, the electrical switch is open and the sense voltage is not passed through the electrical switch back to an input of the controller; and wherein, based on the push button assembly being in an unpressed state, the electrical switch is closed and the sense voltage is passed through the electrical switch back to the input of the controller.

14. The seat structure of claim 11, wherein the at least one actuation device comprises two actuation devices, wherein the controller sends the actuation signaling to each of the actuation devices based on signaling information from the interface assembly, wherein the first electrical cabling from the controller to each of the two actuation devices comprises two electrical cables, wherein a first actuation device of the two actuation devices is attached to a first release lever of a first recline release cylinder of the two recline release cylinders by the first mechanical cable, and wherein a second actuation device of the two actuation devices is attached to a second release lever of a second recline release cylinder of the two recline release cylinders by the second mechanical cable.

15. The seat structure of claim 11, wherein the controller is communicatively connected to the interface assembly using a wireless communication protocol.

16. The seat structure of claim 11, wherein the controller is communicatively connected to the interface assembly through a hard-wired electrical connection.

17. A seat recline release system, comprising:
an interface assembly;
at least one actuation device communicatively connected to the interface assembly, wherein the actuation device is configured to receive electrical or electronic actuation communication information initiated by the interface assembly, and to provide mechanical motion according to the electrical or actuation communication information;
a first mechanical cable and a second mechanical cable, each having a first end connected to the at least one actuation device;

two recline release cylinders;
a controller, configured to receive actuation signaling information from the interface assembly, wherein the controller is electrically connected to the at least one actuation device through first electrical cabling, and wherein the controller sends the actuation signaling to the at least one actuation device based on receiving the actuation signaling information from the interface assembly; and
a first cylinder piston arm and a second cylinder piston arm, each connected to a lower support frame of a seatback in a seat, wherein the first cylinder piston arm and the second cylinder piston arm are each operable to move within a respective recline release cylinder of the two recline release cylinders according to the mechanical motion, and wherein a reclined position of the seatback is associated with a position of each cylinder piston arm within the respective recline release cylinder;
wherein a first gas release button on a first recent release cylinder of the two recline release cylinders and a second gas release button on a second recline release cylinder of the two recline release cylinders are each configured to be depressed or released based on the mechanical motion;
wherein the at least one actuation device being configured to provide the mechanical motion according to the electrical or actuation communication information comprises the at least one actuation device being configured to move a first mechanical cable and a second mechanical cable to first positions and depress the first gas release button and second gas release button in response to an activation state of the interface assembly being in a depressed state;
wherein the actuation device being configured to provide the mechanical motion according to the electrical or actuation communication information further comprises the actuation device being configured to move the first mechanical cable and the second mechanical cable to second positions that release the first gas release button and second gas release button in response to an activation state of the interface assembly being in a released state; and
wherein the first cylinder piston arm and second cylinder piston arm are each free to move within a respective recline release cylinder of the two recline release cylinders based on a respective one of the first gas release button and second gas release button being depressed, and wherein the first cylinder piston arm and second cylinder piston arm are each held in substantially the same position within the respective recline release cylinder based on the respective one of the first gas release button and second gas release button being released.

* * * * *